June 11, 1940.  E. B. WILES  2,203,934
VENTILATING WINDOW FOR MOTOR VEHICLES
Filed Oct. 15, 1938  2 Sheets-Sheet 1
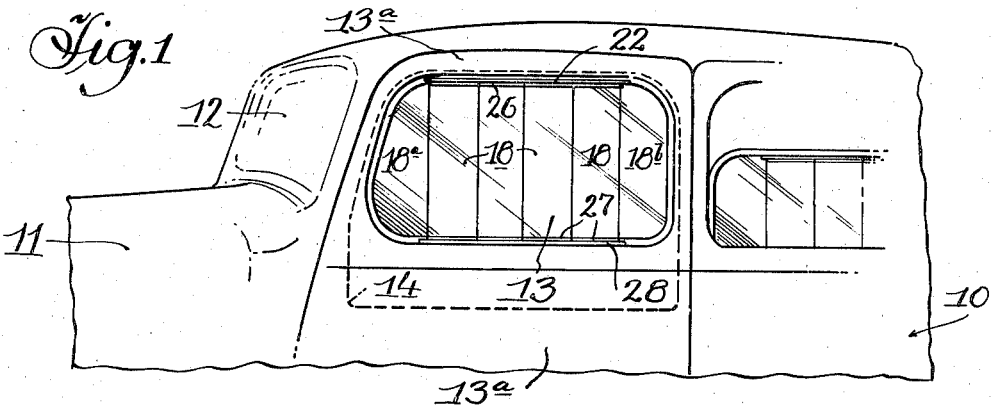
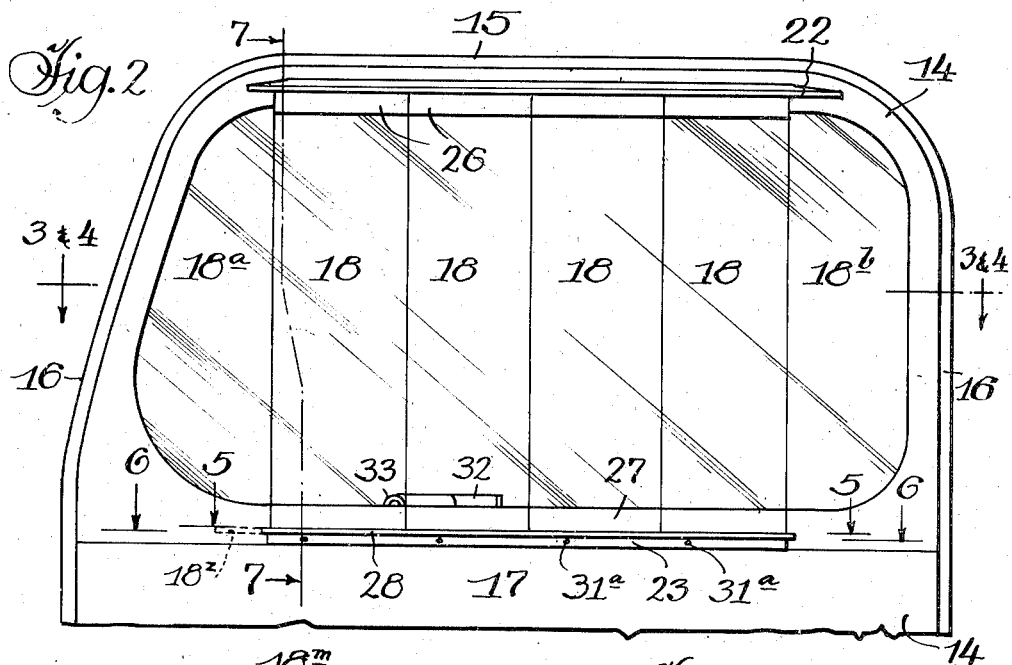
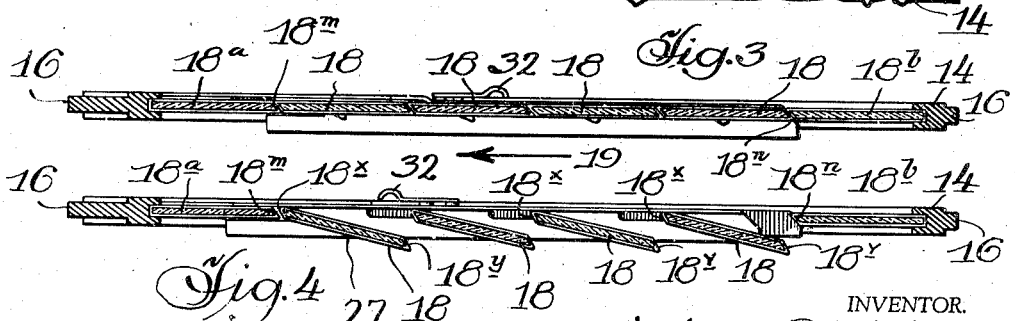
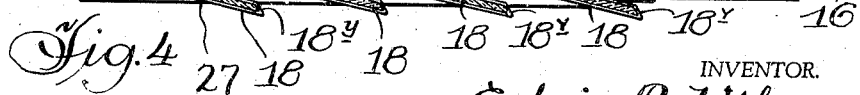
INVENTOR.
Edwin B. Wiles,
Offield Mehlhope Scott & Poole
ATTORNEYS.

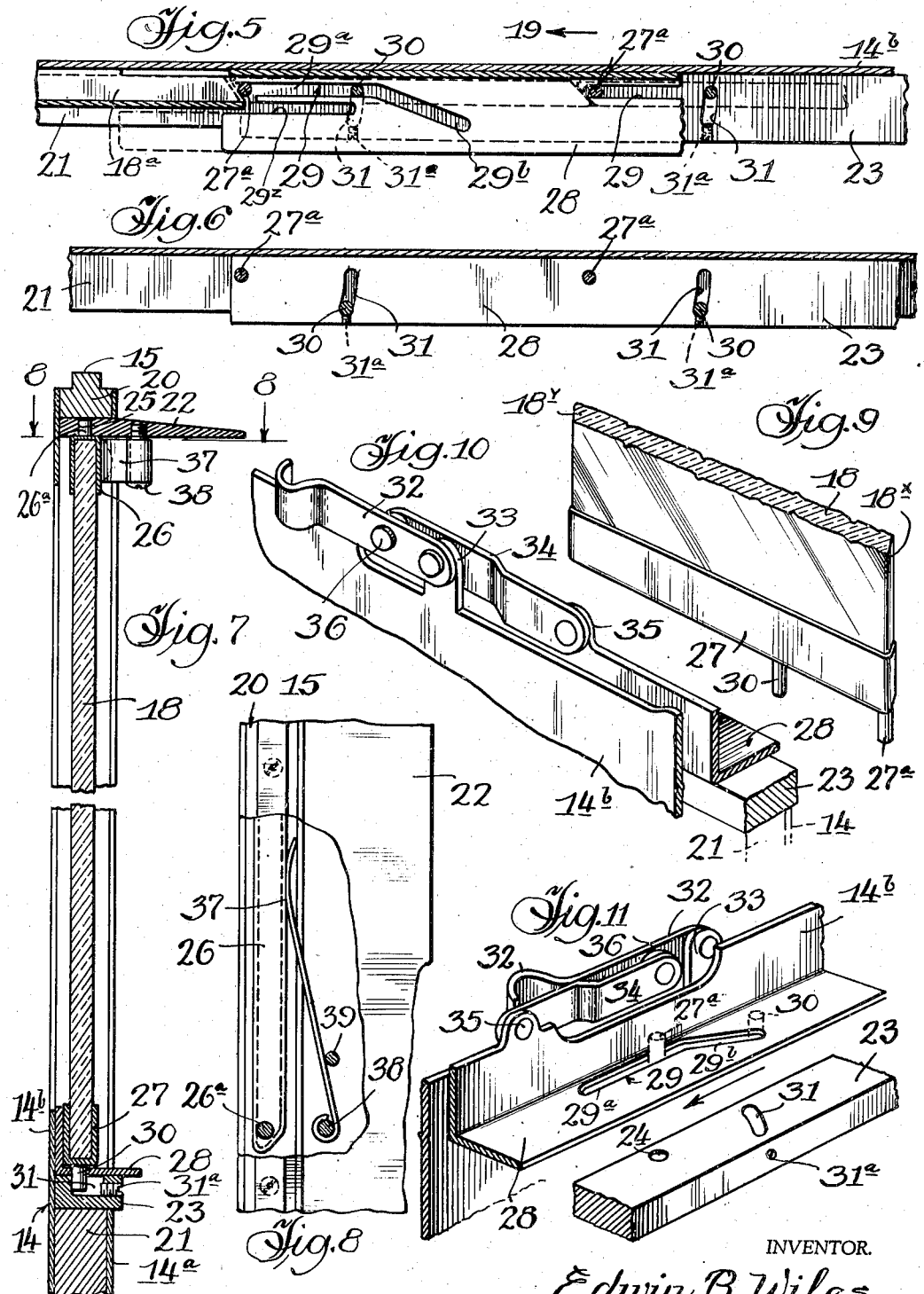

Patented June 11, 1940

2,203,934

UNITED STATES PATENT OFFICE 2,203,934

VENTILATING WINDOW FOR MOTOR VEHICLES

Edwin B. Wiles, Chicago, Ill.

Application October 15, 1938, Serial No. 235,114

2 Claims. (Cl. 296—44)

This invention relates to improvements in ventilating windows for vehicles and more particularly for a motor car.

The object of the invention is to provide a window of the kind of such construction and operation that the vehicle may be efficiently ventilated without producing any draft in the interior of the vehicle, as in the case of ventilating windows heretofore used.

Another object of the invention is to provide a window adapted for the ventilation of the interior of a car or vehicle which, when open for ventilating purposes, will prevent the entrance of rain, snow, dust, insects and the like into the interior of the car.

Other advantages of the invention will appear more clearly as I proceed with my specification.

In the drawings:

Figure 1 is a partial perspective view of a motor car body provided with front and back side windows made in accordance with the invention, it being understood that the windows will be the same on the side of the car opposite to that appearing in the drawing.

Figure 2 is a view representing on an enlarged scale a side elevation of the improved window as viewed from the outside of the car.

Figures 3 and 4 are horizontal cross-sectional views through the window in a plane indicated by the lines 3—3 and 4—4 of Figure 2.

Figures 5 and 6 are horizontal partial cross-sections of the window on an enlarged scale in planes indicated, respectively, by the lines 5—5 and 6—6 of Figure 2.

Figure 7 is a vertical sectional view on an enlarged scale in a plane indicated by the broken line 7—7 of Figure 2.

Figure 8 is a view representing a top plan of Figure 7 indicated by the line 8—8 thereof, with a drip plate, to be described later, partially broken away to show a detail of the construction at the top of the window.

Figure 9 is a partial perspective view of one of the sections of the improved window.

Figure 10 is a fragmentary perspective view, looked at from the inside, showing the mechanism for operating the sections of the window.

Figure 11 is a perspective view of the like mechanism as it appears when looked at from the outside of the window.

Referring now to that embodiment of the invention illustrated in the drawings: 10 indicates the body of a motor car provided with my improved windows. 11 indicates the cowl; 12 indicates the windshield; and 13 indicates the improved window applied to a car door 13ª.

The improved window takes the place of, and is operated up and down to close or open in the same manner as, windows heretofore used in motor cars. It comprises a frame 14 rabbeted at its top and side edges as indicated at 15, 16, 16 for vertical guiding engagement within grooves in the door frame or body frame, as the case may be, as in windows heretofore made. 17 indicates the base of said frame. The frame is formed at the top and sides in any suitable manner to fit the design of the car to which it is to be applied. The window 13 for the door is comprised of a plurality of vertical sections 18 of equal width interposed between front and rear sections 18ª and 18ᵇ. The front and rear sections 18ª and 18ᵇ are fixed in the frame in any familiar manner. The sections 18 are hinged in the frame to swing upon a vertical axis at the forward ends of the sections.

Figure 3 shows the improved window with the hinge sections 18 in closed position. Figure 4 shows the sections 18 when in open position for ventilation purposes, as when they have been swung outwardly (the arrow 19 between said figures indicating the direction of travel of the car). To make a close joint between the sections 18 when they are in closed relation, they are each provided with front and rear beveled vertical edges 18ˣ and 18ʸ, respectively, the plane of the bevel being inclined outwardly, rearwardly with respect to the interior of the car. By this construction an overlapping relation between said edges is provided when the sections are swung on their hinges from the open position shown in Figure 4 to the closed position shown in Figure 3. The fixed end sections are likewise provided at their rear and forward edges respectively with similar beveled edges 18ᵐ and 18ⁿ.

Referring now to the specific mechanism illustrated for mounting the window sections in the frame 14: 20 (see Figure 7) indicates the top rail of the window frame, and 21 indicates the bottom rail. 14ª and 14ᵇ indicate glass tops fixed to the window frame 14. 22 indicates a horizontal rain or drip flange at the top of the window frame projecting laterally on the outside. Said flange 22 is a plate extending at each end beyond the inner edges of the fixed sections 18ª and 18ᵇ of the window, as shown in Figure 2. It is removably secured in any convenient manner to the bottom side of the top rail 20. On the bottom rail 21 is mounted a housing rail or plate 23. Said housing is provided at suitably spaced points with bearing openings 24. The plate 22 is likewise provided with bearing openings 25. The movable window sections 18 are reinforced at the top and bottom by metal channels 26 and 27, respectively. And the top channel 26 has an upwardly projecting pin 26ª which engages within the opening 25 in the plate 22, and the bottom channel has a depending pin 27ª which engages within an associated hole 24 in the housing 23.

28 indicates a slidable plate which is preferably in the form of an angle plate mounted to slide upon the housing 23. Said plate is provided with slots 29 each having a branch 29ª extending parallel to the normal plane of the window sections 18 when in closed relation, and an outwardly inclined branch 29ᵇ, as shown in Figures 5 and 11. The pin 27ª depends through said slot. A second pin 30 depends from the bottom channel plate 27 at a point spaced rearwardly from the pin 27ª, as shown in Figure 5. Said pin, when the sections are closed, depends through the branch 29ª of the slot 29. But when the plate 28 is moved forwardly (in the direction of the arrow as shown in Figure 5), the outwardly inclined branch 29ᵇ of the slot 29 will engage the pin 30 and obviously swing the associated window section 18 from the closed position shown in Figure 3 to the open position shown in Figure 4. The pin 30 depends through the slot 29 into a groove 31 (see Figures 6 and 11) in the housing 23, which groove permits the above described movement of the pin 30 when opening the window sections. It also defines and limits said movement so as to prevent vibration. A screw 31ª set in the edge of the housing plate 23 (see Figures 5, 6, 7 and 11) and extending into the end of the groove 31 provides means for taking up wear on the operating pin 30. The hinge pins 27ª of the several window sections by their engagement in the slots 29, provide directional guiding means for the movement of the plate 28—said movement being permitted without obstruction by the forward fixed pane section 18ª because of an end slot 29ᶻ in said plate shown in Figure 5 and a slot 18ᶻ in said pane section shown in Figure 2.

Any suitable means for operating the angle plate 28 may be used. As illustrated in the drawings, this means comprises the following: A lever 32 (see Figures 10 and 11) is pivoted to an upright lug 33 on the bottom member of the window frame in such manner as to swing in a vertical plane parallel to the window sections 18. A link 34 is pivotally connected at one end to a lug 35 rising from the angle bar 28. Its other end is pivotally connected to the lever 32 as indicated at 36, at a point spaced a short distance rearwardly of the fulcrum point of the lever 32 (as shown in Figure 10), when the window sections are in closed relation.

By swinging the lever 32 on its fulcrum 33 from the position shown in Figure 10 to the position shown in Figure 11, the angle bar 28 will be moved forwardly to open the sections 18.

The angle of opening of the sections 18 may be varied as desired. Preferably a maximum angle of opening sufficient to displace the rear edges of the sections about three-quarters of an inch is ample. It will be understood that the drip plate 22 projects beyond the window from a sufficient distance to cover the window sections when at their limit in open position.

Preferably there is provided at the top of the hinged window section a spring which engages the top channel 26 of said section. 37 indicates such spring in Figure 8. It is a leaf spring mounted on a pin 38 depending from the drip plate 22 with its rounded end engaged with said channel plate, such engagement being maintained by a second pin 39 depending from said drip plate. By this construction the window sections are prevented from vibrating in the first place, and in the second place they compensate for such wear as may occur in the moving operating parts as time goes on.

When the window sections are open and the car is in motion, the air from the interior of the car will evidently be drawn out through the spaces between the window sections. The supply of air within the interior of the car will be maintained by the entrance of air through the cowl of the car. As a result there is a continuous movement of air when the car is running, through the spaces between the window section 18. There will be no draft within the car body, although there will be a continuous supply of fresh air. No rain or snow can enter, as it will be prevented from entering by reason of the force of the air drawn outwardly between the window sections. Rain, snow, insects and dust or dirt will likewise be prevented from entering the car for the same reason. Water which might enter between the open window sections at the top is blocked by the drip or drain plate 22.

While in describing my invention I have referred to many details of mechanical construction and of arrangement of parts, it is to be understood that the invention is in no way limited thereto, except as may be pointed out in the appended claims.

I claim as my invention:

1. A ventilating window for motor vehicles comprising in combination with a body member provided with a window opening having a well below said window opening, a frame vertically movable in said window opening and in said well, a pane secured in said frame including a plurality of vertically extending adjacent sections, each section being provided with top and bottom hinge pins in line with its front edge, means providing bearings at the top and bottom of said frame for said hinge pins, the bottom bearings consisting of a housing plate fixed to the bottom rail of said frame and provided with spaced bearing apertures, each section having a pin spaced rearwardly from an associated hinge pin, a plate movable on said housing plate and provided with slots, one for each pane section, each slot having a branch extending parallel to said pane and a branch inclining outwardly away from said pane, said second named pin and the associated hinge pin depending through said first named branch when said pane sections are in closed relation, said housing plate being provided with arcuate grooves to guide the bottom ends of said second named pins, said slots being adapted to swing said second named pins outwardly or inwardly by the movement of said slotted plate in one direction or the other.

2. A ventilating window for motor vehicles comprising in combination with a body member provided with a window opening having a well below said window opening, a frame vertically movable in said window opening and in said well, a pane secured in said frame including a plurality of vertically extending adjacent sections, each section being provided with top and bottom hinge pins in line with its front edge, means providing bearings at the top and bottom of said frame for said hinge pins, the bottom bearings consisting of a housing plate fixed to the bottom rail of said frame and provided with spaced bearing apertures, each section having a pin spaced rearwardly from an associated hinge pin, a plate movable on said housing plate and provided with slots, one for each section, each slot having a branch extending parallel to said pane and a branch inclining outwardly away from said pane, said second named pin and the associated hinge pin depending through said first named branch when said pane sections are in closed relation, said housing plate being provided with arcuate grooves to guide the bottom ends of said second named pins, said slots being adapted to swing said second named pins outwardly or inwardly by the movement of said slotted plate in one direction or the other, and means on the inside of said frame for actuating said slotted plate.

EDWIN B. WILES.